United States Patent [19]

Lang et al.

[11] Patent Number: 5,536,043
[45] Date of Patent: Jul. 16, 1996

[54] AIR BAG ACTIVATED KNEE BOLSTER

[75] Inventors: Gregory J. Lang; Brent R. Marchant, both of Ogden; Bradley D. Harris, Farmington, all of Utah; Steven R. Fredin, Ortonville, Mich.; Christopher Hock, Uintah, Utah; Patrick G. Jarboe, Shelby Township, Mich.

[73] Assignee: Morton International, Inc., Chicago, Ill.

[21] Appl. No.: 527,306

[22] Filed: Sep. 12, 1995

Related U.S. Application Data

[63] Continuation of Ser. No. 247,797, May 23, 1994, abandoned.

[51] Int. Cl.$^6$ .................................................. B60R 21/045
[52] U.S. Cl. .................. 280/753; 280/728.3; 280/730.1; 280/732; 280/752
[58] Field of Search .............................. 280/743.2, 728.3, 280/753, 752, 732, 730.2

[56] References Cited

U.S. PATENT DOCUMENTS

| | | | |
|---|---|---|---|
| 4,062,566 | 12/1977 | Hensler et al. | 280/751 |
| 4,198,075 | 4/1980 | Kob et al. | 280/728 B |
| 4,921,735 | 5/1990 | Bloch | 280/743 A |
| 4,943,086 | 7/1990 | Cunningham | 280/741 |
| 4,964,653 | 10/1990 | Parker | 280/732 |
| 5,044,663 | 9/1991 | Seizert | 280/732 |
| 5,125,682 | 6/1992 | Hensler et al. | 280/743 A |
| 5,199,834 | 4/1993 | Seidl et al. | 411/5 |
| 5,211,421 | 5/1993 | Catron et al. | 280/732 |
| 5,374,079 | 12/1994 | Dukeshire et al. | 280/732 |

FOREIGN PATENT DOCUMENTS

| | | | |
|---|---|---|---|
| 586131 | 3/1994 | European Pat. Off. | 280/743 A |
| 2-249740 | 10/1990 | Japan | 280/730 A |
| 4-310450 | 11/1992 | Japan | 280/728.3 |
| 5-338513 | 12/1993 | Japan | B60R 21/20 |
| 6-032195 | 2/1994 | Japan | B60R 21/22 |
| 2236082 | 3/1991 | United Kingdom | 280/728 B |
| 2263669 | 8/1993 | United Kingdom | B60R 21/22 |
| 2265119 | 9/1993 | United Kingdom | B60R 21/20 |

OTHER PUBLICATIONS

*Automotive Engineering*, "Evolution of Air Bag Componants and Materials", vol. 102, #2, pp. 99–103 Feb. 1994.

*Primary Examiner*—Eric D. Culbreth
*Attorney, Agent, or Firm*—Gerald K. White

[57] ABSTRACT

A tethered knee bolster panel which is deployed rearward in the passenger compartment of an automotive vehicle during a crash to provide lower torso restraint. The knee bolster is an air bag system which propels the knee bolster panel rearward during deployment. The activated knee bolster allows automobile designers the flexibility to provide increased leg room in the vehicle while maintaining the same level of safety during a crash.

13 Claims, 3 Drawing Sheets

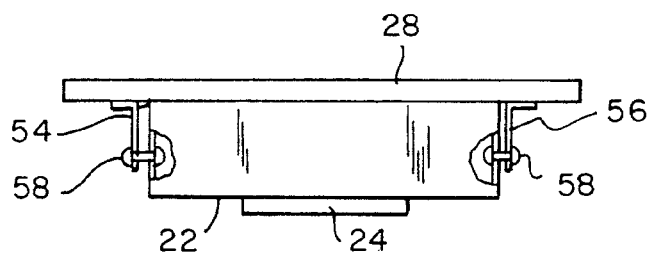
FIG. 6
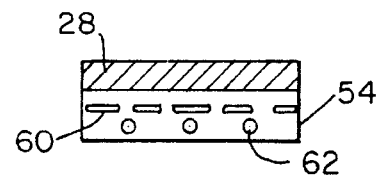
FIG. 7
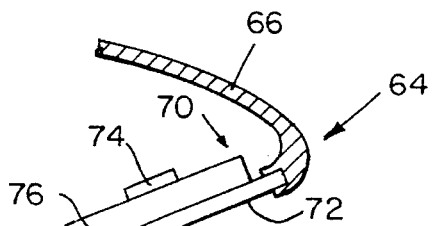
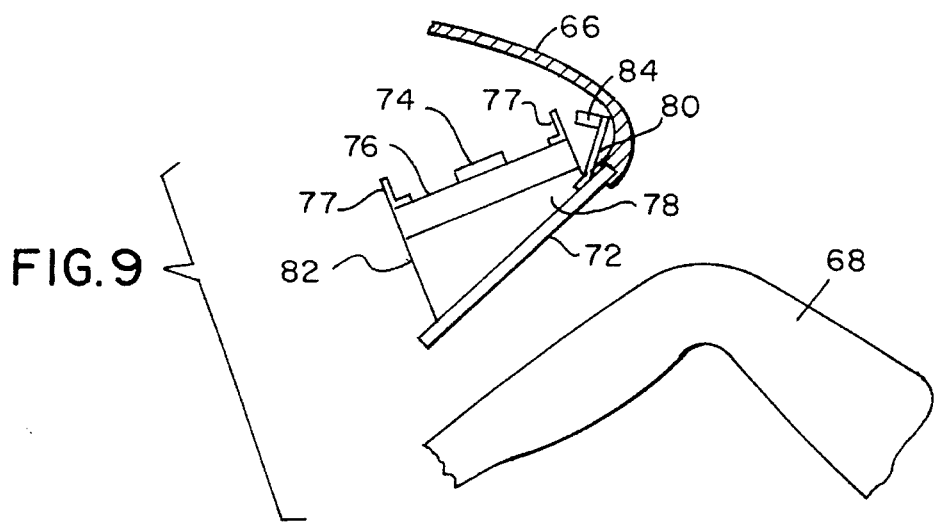
FIG. 8
FIG. 9

AIR BAG ACTIVATED KNEE BOLSTER

This is a continuation of co-pending application Ser. No. 08/247,797 filed on May 23, 1994, now abandoned.

BACKGROUND OF THE INVENTION

1. Field of the Invention

The present invention relates to automotive safety restraint devices and more particularly, to an improved knee bolster which is deployed rearwardly in a vehicle during a crash to provide lower torso restraint.

2. Description of the Prior Art

Automotive vehicles provided with safety restraint devices including inflatable air bags are currently being designed with a stationary panel, located on a downward and forwardly inclined portion of the instrument panel, which panel acts as a knee crush zone. The portion of the instrument panel enclosed in the knee crush zone is classified as a "knee bolster." During a crash, momentum causes the occupant to move forward and the legs of the occupant contact the knee bolster. This prevents or stops the occupant from submarining underneath the inflated air bag. The knee bolster then deforms or crushes under the load, absorbing energy and minimizing the forces acting on the occupant's legs.

Inflatable air bag devices that have heretofore been proposed are located in the passenger compartment of automotive vehicles and act as a cushion when deployed to safely restrain passengers in the event of a crash. Such devices comprise an inflatable air bag module stored behind the instrument panel of the vehicle. An inflatable air bag cushion deployed from an air bag module located behind the instrument panel is positioned to absorb the momentum and thereby protect a seated passenger.

The onset of a crash is detected by a sensor which activates an inflation device, which device is internally located in the air bag module and produces a flow of inflating gas into the inflatable air bag. This causes the air bag to be deployed as a protective cushion for the occupants within the vehicle passenger compartment.

As installed behind the vehicle instrument panel, the inflatable air bag is in folded condition. The folded air bag and the inflation device are contained within a reaction canister of the air bag module, which canister is provided with a generally rectangular cover. The cover also comprises the cover or door for an air bag deployment opening that is formed in a portion of the instrument panel.

The use of a crushable stationary panel on the instrument panel of an automotive vehicle to provide a knee crush zone or bolster is disadvantageous. This is because the reduction in the distance between the occupant's knees and the instrument panel detracts from and diminishes the amount of leg room and the feeling of roominess the occupant would prefer to retain.

Thus there has existed a need and a demand for a better solution to this problem. The present invention was devised to fill the technological gap that has existed in the art in this respect.

SUMMARY OF THE INVENTION

An object of the invention is to provide an automotive safety restraint device comprising an air bag activated tethered panel or knee bolster which is deployed rearward in the vehicle during a crash to provide lower torso restraint.

Another object of the invention is to allow automotive vehicle designers the flexibility to provide increased leg room for the occupant without increasing the potential for injury during a crash.

A further object of the invention is to lower the deployment velocity of the air bag activated panel or knee bolster to reduce the potential for injury to an out-of-position occupant.

Still another object of the invention is to provide a knee bolster comprising a knee impact panel which is pivotally supported along its upper edge and is deployed and restrained by an air bag system.

In accomplishing these and other objectives of the invention there is provided an activated knee bolster panel which is deployed during a crash to provide lower torso restraint. The activated knee bolster is an air bag system, an inflator and inflatable air bag or cushion, that when inflated, pushes or propels the panel rearward in the automobile. The occupant's knees hit the panel during a crash and slow the forward motion of the lower torso. The knee bolster panel is located at a downward and forwardly inclined portion of the instrument panel. During deployment, pressure acting on the back of the panel from the inflating air bag creates a force sufficient to separate the panel from the instrument panel. This allows the rearward movement of the panel. Tethers limit the rearward movement of the panel during deployment. The inflated air bag (vented or unvented) in combination with the tethers position the panel in the proper location. The inflated air bag resists the rearward movement of the panel during occupant impact. The inflator used to inflate the air bag can be a pyrotechnic or stored gas type of inflator. The cushion can be fabricated from nylon or polyester cloth.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWINGS

With this description of the invention, a detailed description follows with reference being made to the accompanying figures of drawing which form part of the specification, in which like parts are designated by the same reference numerals, and of which:

FIG. 6 is a schematic view showing a modified way to attach the activated knee bolster panel to the knee bolster housing;

FIG. 7 is a view illustrating a tear tab used in the modified attachment arrangement shown in FIG. 6;

FIG. 8 is a schematic side illustration showing in retracted position a hinged knee impact panel which is pivotally supported along its upper edge and is deployable by an air bag system; and FIG. 9 is a schematic side illustration showing in deployed position the hinged knee impact panel of FIG. 8.

DESCRIPTION OF THE PRIOR ART

Figure 1:
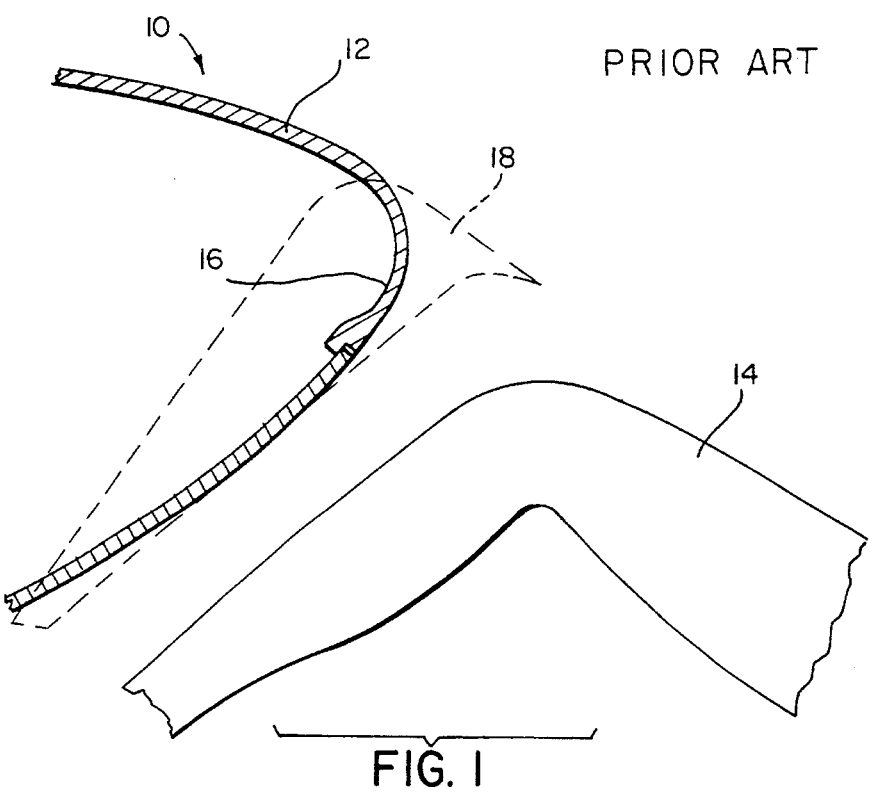
FIG. 1 is a schematic side view illustration typifying the prior art knee bolsters comprising a deformable or crushable stationary panel located on the vehicle instrument panel.

FIG. 1 schematically illustrates the passenger compartment 10 of an automotive vehicle. Arranged within the compartment 10 are an instrument panel 12 and the forwardly extended leg 14 of an occupant (not shown) seated in the compartment 10.

In FIG. 1 the portion 16, indicated in dotted lines on the rearward facing side of the instrument panel at a downward forwardly inclined portion thereof and encased in a knee crush zone 18, is classified as a knee bolster. During a crash the occupant moves forward and the occupant's legs contact the knee bolster 16, preventing or stopping the occupant from submarining under the inflated cushion (not shown) of the associated air bag device. The knee bolster 16 then deforms or crushes under the load, absorbing energy and minimizing the forces acting on the occupant's legs.

DESCRIPTION OF THE PREFERRED EMBODIMENT

Figure 2:
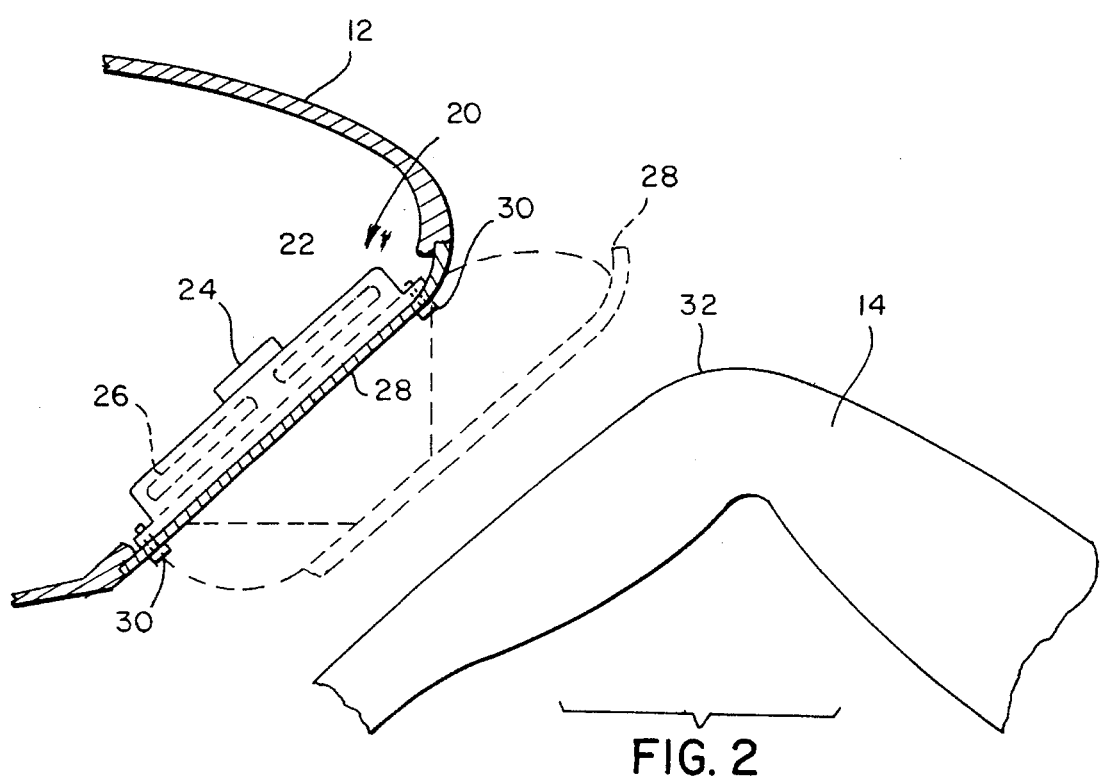
FIG. 2 is a schematic side illustration of an activated knee bolster according to the invention.

Referring to FIG. 2, an activated knee bolster 20 is shown positioned on the downward forwardly inclined portion of the rearward facing side of the vehicle instrument panel 12. The activated knee bolster 20 includes a reaction canister or housing 22, an inflator 24, an inflatable air bag 26 that is stored within the reaction canister 22, and a knee bolster panel 28. Housing or reaction canister 22 is a wide, shallow, pan-shaped vessel. The knee bolster panel 28 comprises the door for an air bag deployment opening that is formed in a portion of the instrument panel 12 of the automotive vehicle. In FIG. 2 the knee bolster panel 28 also is shown by dotted lines in a deployed position closer to the leg 14 of the occupant. Panel 28 is attached to the housing 22 by attaching means comprising plastic fasteners such as push-in rivets 30, or any other suitable means. By such attachment the knee bolster panel 28 is positioned in closing relation to the opening for air bag deployment that is formed in a portion of the instrument panel 12 of the vehicle.

The activated knee bolster 20 is located on the passenger side or driver side of the vehicle. It encompasses the entire area where an occupant's knees contact the instrument panel during a crash. The approximate dimensions of the bolster panel 28 are 10"×20".

During a crash the knee bolster panel 28 deploys rearwardly in the vehicle, as illustrated in FIG. 2. This reduces the distance between the occupant's knees 32 and the knee bolster panel 28, resulting in a lower force acting on the legs of the occupant during impact thereof with the knee bolster panel 28.

Use of an activated knee bolster 28 allows automotive designers the flexibility to increase the distance between the occupant and the instrument panel 12 without compromising on safety.

Figure 3:
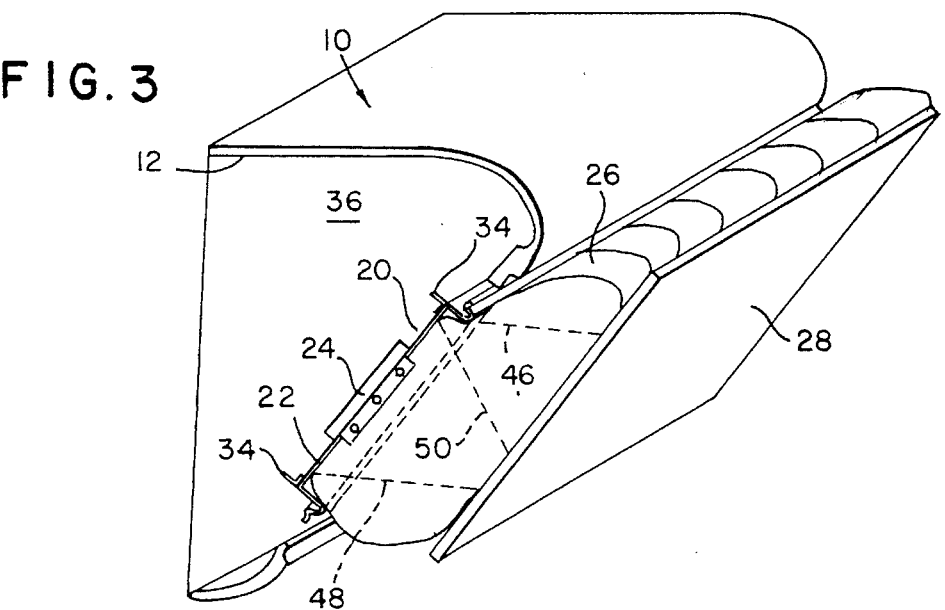
FIG. 3 is a schematic side view of an activated knee bolster according to the invention provided with tethers to limit the rearward movement of the panel during deployment and including a stabilizing positioning tether.
Figure 4:
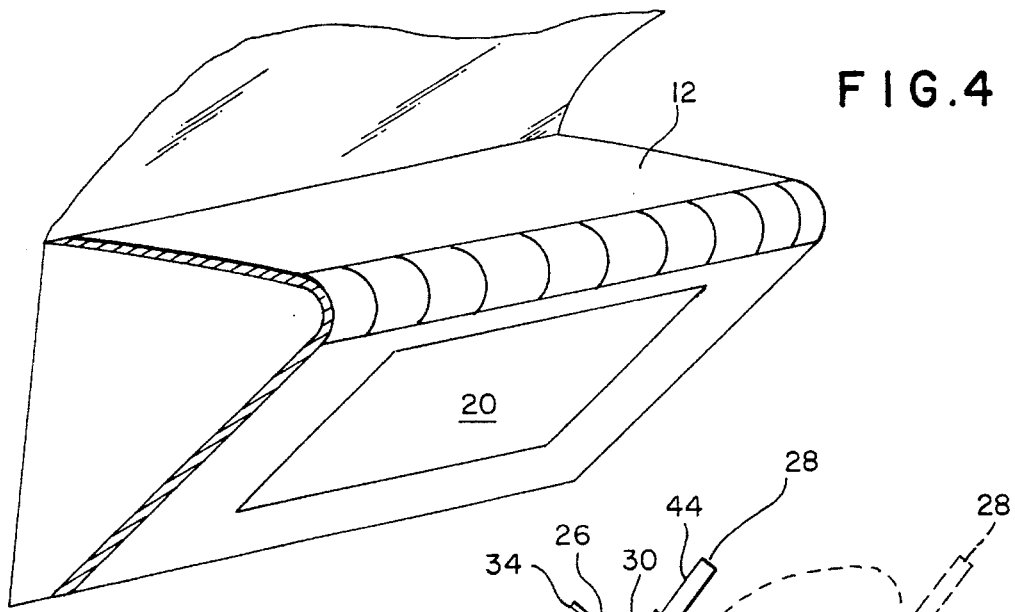
FIG. 4 is an isometric or perspective view prior to deployment of the knee bolster shown in FIG. 3.

As shown in FIG. 3, support member or mounting brackets 34 are located within a cavity 36 behind the instrument panel 12 by any suitable means, being attached to an integral element of the automotive vehicle, or optionally, comprising such integral element itself if in proper location to permit such use thereof.

Activated knee bolster 20, comprising reaction canister 22, inflator or gas generator 32, inflatable air bag 34 and knee bolster panel 28, is fastened to the mounting brackets 34 at a position behind the instrument panel 12 at a forward downward sloping portion thereof.

Figure 5:
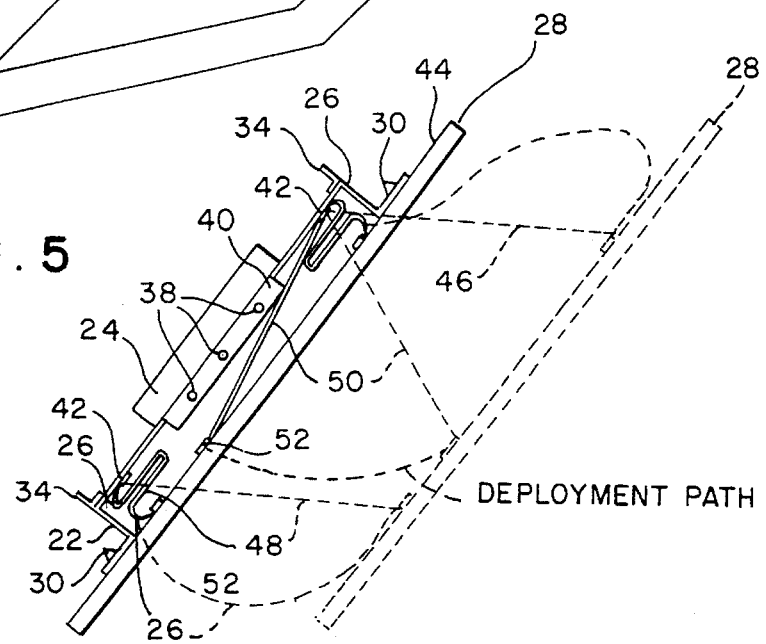
FIG. 5 is a cross sectional view of the FIG. 3 knee bolster prior to deployment and illustrates the arrangement of the normally stored inflatable air bag and internally located tethers.

Inflator 24 may be a pyrotechnic type, as disclosed, for example, in U.S. Pat. No. 4,943,086 to Donald J. Cunningham, which patent is assigned to the assignee of the present invention. As shown in FIG. 5, inflator 24 is characterized in that the gas generated thereby flows generally radially outwardly from a plurality of ports 38. The ports 38 are arranged at substantially equal intervals around the circumference of the inflator portion 40, which portion 40 is substantially circular in transverse cross section and is contained in sealed relation within the inflator air bag 26.

The air bag 26 may be made of coated or uncoated standard or conventional nylon or polyester cloth material.

As indicated in FIG. 3 when deployed the air bag 26 is tubular in shape having a rectangular cross section that is, the cross section of the air bag is then that of a rectangle. At one end of the tubular arrangement thereof, the air bag 26 is securely attached in any suitable sealing conventional manner, as by means of a suitable first retaining ring 42, to the reaction canister 22, internally and adjacent the periphery thereof. At the other end thereof the air bag 26, when deployed, engages the forward facing wall 44 of the knee bolster panel 28.

When installed in the automotive vehicle, as illustrated in FIG. 5, the air bag 26 is suitably folded and stored in the housing or reaction canister 22 between the inflator 24 and the panel 28.

As previously mentioned, the invention is a tethered panel knee bolster which is deployed rearward in the vehicle during a crash to provide lower torso restraint. The knee bolster is an air bag system which propels the panel 28 rearward during deployment.

During deployment, pressure acting on the back of the panel 28 from the inflating air bag 26 creates a force sufficient to separate the panel 28 from the housing 22. This allows the rearward movement of the panel 28. The inflated air bag 26 resists the rearward movement of the panel 28 during occupant impact.

Tethers are provided, in accordance with the invention, to provide additional forces to resist the propelled or rearwardly urged movement of the panel 28 when activated. Each of the tethers employed comprises a polyester or nylon strap one (1) inch wide and a thickness in the range of fifty thousandths to one-tenth of an inch.

As shown in FIGS. 3 and 5, spaced parallel tethers 46 and 48 and a diagonal or positional tether 50 are located internally of the inflatable air bag 26. A first end of each of the tethers 46, 48 and 50 is securely attached to the reaction canister or housing 22 by the retaining ring 42, with the attachment of the first end of the tether 50 to the housing 22 being adjacent the attachment of the most elevated of the parallel tether first end attachments thereto. The second end of each of the tethers 46, 48 and 50 is attached to the forward facing side of the panel 28 by a first retaining ring 52 which is positioned internally of the air bag 26, with the attachment of the second end of the diagonal tether 50 to the panel 28 being adjacent the least elevated of the parallel tether second end attachments thereto. The inflating gas inlet or mouth of the air bag 26 is also attached to the housing 22 by the retaining ring 42.

The spaced parallel tethers 46 and 48 and the positional tether 50 are contained inside of the inflatable air bag 26 or bladder 26 so as not to interfere with the deployment of the inflating air bag. The diagonal or positional tether 50 is used to position the panel 28 in the proper location. That is to say, the panel 28, when deployed, is forced to move along a rearward and upward extending arc, as shown in FIG. 5, determined by the length of the diagonal tether 50. The positional tether 50 adds stability to the system during impact and positions the panel 28 in the proper location. Ideally, the positional tether 50 is taut when in the retracted position, as indicated in FIG. 5. The tether 50 does not, however, need to be taut in the retracted position to position the panel 28 and provide stability.

The retaining ring 52 may be "E" shaped so that all of the tethers 46, 48 and 50 are attached to the forward facing side 44 of the knee bolster panel 28 at a position substantially midway the width thereof.

The positional tether 50 provides the following advantages:

(1) reduces the impact loading on the tethers since the panel 28 is forced to move along an arc determined by the length of the tether 50;

(2) minimizes vertical distance that the panel 28 travels during deployment that is, minimizes the degree to which the panel 28 will be out-of-position; and (3) increases the stability of the panel 28 during occupant loading.

The inflated air bag 26 provides support to the entire surface area of the panel 28. Tethers 46 and 48 are attached to the panel 28 and the housing 22 at positions midway the width thereof.

FIGS. 6 and 7 illustrate a modification in the attachment of the knee bolster panel 28 to the housing 22. Instead of utilizing plastic fasteners such as rivets and studs 30, as shown in FIG. 2, there are provided two tear tabs 54 and 56 which may extend along the opposed vertical walls of the housing 22 for the full length thereof, being attached thereto by rivets 58, which tear tabs 54 and 56 are attached in a suitable manner to the forwardly extending wall 44 of the panel 28.

Tear tabs 54 and 56, as employed in FIG. 6, are shown in greater detail in FIG. 7. As shown in FIG. 7, each of the tear tabs 54 and 56 includes perforated tear areas 60 and spaced holes 62 for facilitating attachment by rivets 58 to the walls of the housing 22. The tear strength of the tear tabs 54 and 56 can be varied by changing the distance between the perforated tear areas 60.

In FIG. 8 there is shown a schematic side illustration, in retracted position, of another embodiment of the invention. Arranged within the compartment 64 of an automotive vehicle are an instrument panel 66 and the forwardly extended leg 68 of an occupant (not shown) seated in the compartment 64.

An activated knee bolster 70 is shown in FIG. 8 positioned on the downward forwardly inclined portion of the rearward facing side of the instrument panel 66. The activated knee bolster 70 comprises a panel 72, hinged at an upper edge thereof, as shown in FIGS. 8 and 9, and which is deployed and restrained by an air bag system including an inflator 74, a reaction canister or housing 76, and an air bag or cushion 78. The housing 76 is attached to the automotive vehicle by suitable bracket means 77.

When the air bag is deployed, as shown in FIG. 9, the hinged panel 72 swings counterclockwise on a hinge 80. This allows the unhinged panel portion to move, that is, generally tilt rearward counterclockwise in the vehicle minimizing the space between the leg 68 of the occupant and the panel 72. The hinge 80 may be attached to a bracket that is attached to and rigid with the vehicle or to a cross car beam (not shown) provided in the vehicle. During a crash the occupant's knees hit the panel 72 and slow the forward motion of the lower torso of the occupant. The knee bolster panel 72 is attached to the instrument panel 66 of the automotive vehicle using the hinge mechanism 80. During deployment pressure acting on the back of the panel 72 from the inflating air bag 78 creates a force sufficient enough to deploy the panel 72. One or more tether straps 82 are attached, internally of the air bag 78 between the lower edge of the panel 72 and the housing 76 to limit the rearward movement of the panel 72 during deployment. The inflated air bag 78 (vented or unvented) in combination with the tethers 82 position the panel 72 in the proper location. The inflated air bag 78 then resists the rearward movement of the panel 72 during occupant impact. The inflator 74 used to inflate the air bag 78 can be a pyrotechnic or stored gas type of inflator. The hinge 80 can be a standard "door" type of hinge or a single piece deformable type hinge. The air bag 78 can be either rectangular or wedge shaped which is fabricated from nylon or polyester cloth material.

To lower the deployment velocity of the hinged panel 72 and reduce the potential for injury to an out-of-position occupant, a single piece deformable hinge 80 is used. Alternative methods of reducing the panel velocity are to use an elastic material for the tethers 82 or to attach an elastic material to the cloth tethers to absorb energy during deployment used in conjunction with the deformable hinge 80 or the standard "door" hinge.

Thus, in accordance with the invention, there has been provided an automotive safety restraint device comprising an air bag activated tethered panel or knee bolster which is deployed rearward in the vehicle during a crash to provide lower torso restraint. Tethers limit the rearward movement of the knee bolster panel during deployment.

With this description of the invention in detail, those skilled in the art will appreciate that modifications may be made to the invention without departing from the spirit thereof. Therefore, it is not intended that the scope of the present invention be limited to the specific embodiments illustrated and described. Rather, it is intended that the scope of the invention be determined by the scope of the appended claims.

What is claimed is:

1. An air bag activated knee bolster which is deployed in an instrument panel of an automotive vehicle during a crash to a proper location to provide lower torso restraint for an occupant seated therein comprising, a support member means located behind a downward and forwardly inclined portion of said instrument panel of the vehicle, a housing securely mounted to said support member means, an inflator mounted in said housing, a folded air bag stored in said housing, a knee bolster panel for said inflator and said air bag stored in said housing, said panel also comprising the door for an air bag deployment opening that is formed in a portion of said instrument panel of said automotive vehicle, said knee bolster panel having a forward facing side, attaching means positioning said knee bolster panel in the air bag deployment opening that is formed in said portion of the instrument panel of the automotive vehicle, and tether means to limit the rearward movement of said knee bolster panel during deployment, said tether means being located internally of said folded air bag and comprising spaced parallel tethers and at least one diagonal tether, with a first end of each of said tethers attached to said housing at a position substantially midway the width thereof, the first end of each of said parallel tethers being attached to said housing at different elevations, and the second end of each of said tethers attached to the forward facing side of said knee bolster panel at a position substantially midway the width thereof, with the attachment of the first end of said diagonal tether to said housing being adjacent the most elevated of the parallel tether first end attachments thereto, and with the attachment of the second end of said diagonal tether to said knee bolster panel being adjacent the least elevated of the parallel tether second end attachments thereto, said knee bolster panel when deployed being forced to move along an arc determined by the length of said diagonal tether with said arc extending rearward and upward, which action reduces the impact loading on the tethers, whereby the inflated air bag in combination with said tether means positions said knee bolster panel in the proper location to provide lower torso restraint for the occupant seated in said vehicle.

2. An air bag activated knee bolster, as defined in claim 1, wherein said attaching means comprises means attaching said knee bolster panel to said housing.

3. An air bag activated knee bolster, as defined by claim 2, wherein said attaching means comprises plastic fasteners.

4. An air bag activated knee bolster, as defined by claim 3, wherein said-plastic fasteners comprise push-in rivets and studs characterized to break at a predetermined force.

5. An air activated knee bolster, as defined by claim 1, wherein said attaching means comprises tear tabs having perforated tear areas attaching said knee bolster panel to said housing.

6. An air bag activated knee bolster, as defined by claim 1, wherein upon activation of said inflator and deployment of said air bag pressure acting on the back of said knee bolster panel from the inflating air bag create a force sufficient to separate said knee bolster panel from said housing, thereby allowing rearward and upward arcing movement of said knee bolster panel during deployment.

7. An air bag activated knee bolster, as defined by claim 1, wherein said tether means comprises a polyester strap about one inch wide.

8. An air bag activated knee bolster, as defined by claim 1, wherein said tether means comprises a nylon strap about one inch wide.

9. An air bag activated knee bolster, as defined by claim 1, wherein said air bag is fabricated from nylon cloth.

10. An air bag activated knee bolster, as defined by claim 1, wherein said tether means comprises a polyester strap about one inch wide with a thickness in the range of fifty thousandths to one-tenth of an inch.

11. An air activated knee bolster, as defined by claim 1, wherein said tether means comprises a nylon strap about one inch wide and a thickness in the range of fifty thousandths to one-tenth of an inch.

12. An air bag activated knee bolster, as defined by claim 1, further including:

a first retaining ring for attaching the first end of each of said tethers to said housing, and a second retaining ring for attaching the second end of each of said tethers to said knee bolster panel.

13. An air bag activated knee bolster, as defined by claim 1, wherein said tether means includes a pair of spaced parallel tethers and at least one diagonal tether to position and stabilize said knee bolster panel with said diagonal tether being so arranged as to be taut when said knee bolster panel is in a retracted position.

* * * * *

UNITED STATES PATENT AND TRADEMARK OFFICE
CERTIFICATE OF CORRECTION

PATENT NO. : 5,536,043
DATED : July 16, 1996
INVENTOR(S) : Lang et al.

It is certified that error appears in the above-indentified patent and that said Letters Patent is hereby corrected as shown below:

Col. 3, Ln. 65, "member" should read -- members -- .
Col. 6, Ln. 61, "the" should read -- a -- .
Col. 7, Ln. 39, before "push-in" insert -- one of -- .
Col. 7, Ln. 39, "plasticfasteners" should read --plastic fasteners-- .

Signed and Sealed this

Eighteenth Day of November 1997

Attest:

BRUCE LEHMAN

Attesting Officer

Commissioner of Patents and Trademarks